United States Patent
Nagy

(10) Patent No.: US 7,189,675 B2
(45) Date of Patent: Mar. 13, 2007

(54) OLEFIN POLYMERIZATION CATALYST ON PLASMA-CONTACTED SUPPORT

(75) Inventor: Sandor Nagy, Naperville, IL (US)

(73) Assignee: Equistar Chemicals, LP, Houston, TX (US)

(*) Notice: Subject to any disclaimer, the term of this patent is extended or adjusted under 35 U.S.C. 154(b) by 26 days.

(21) Appl. No.: 11/073,813

(22) Filed: Mar. 7, 2005

(65) Prior Publication Data

US 2006/0199726 A1 Sep. 7, 2006

(51) Int. Cl.
*B01J 31/00* (2006.01)
(52) U.S. Cl. .................................................... 502/117
(58) Field of Classification Search .............. 502/117
See application file for complete search history.

(56) References Cited

U.S. PATENT DOCUMENTS

| | | | |
|---|---|---|---|
| 3,485,771 A | 12/1969 | Horvath | 252/430 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,278,384 A | 1/1994 | Matsuzawa et al. | 219/121.36 |
| 5,364,519 A | 11/1994 | Fujimura et al. | 204/298.38 |
| 5,414,180 A | 5/1995 | Geerts et al. | 585/525 |
| 5,609,921 A * | 3/1997 | Gitzhofer et al. | 427/446 |
| 5,633,081 A * | 5/1997 | Clough et al. | 428/331 |
| 5,647,944 A | 7/1997 | Tsubaki et al. | 156/345 |
| 5,648,440 A | 7/1997 | Sugano et al. | 526/132 |
| 6,211,311 B1 | 4/2001 | Wang et al. | 526/131 |
| 6,559,251 B1 | 5/2003 | Wang et al | 526/127 |
| 6,582,778 B2 | 6/2003 | Namiki et al. | 427/575 |
| 6,794,468 B1 * | 9/2004 | Wang | 526/161 |
| 6,861,485 B2 * | 3/2005 | Wang | 526/119 |
| 6,884,749 B2 * | 4/2005 | Neal-Hawkins et al. | 502/120 |
| 6,908,972 B2 * | 6/2005 | Tsuie et al. | 526/160 |
| 6,919,035 B1 * | 7/2005 | Clough | 252/500 |
| 6,933,353 B2 * | 8/2005 | Wang | 526/114 |
| 6,939,930 B2 * | 9/2005 | Reinking et al. | 526/161 |
| 6,958,377 B2 * | 10/2005 | Nagy et al. | 526/162 |
| 6,995,216 B2 * | 2/2006 | Winslow et al. | 526/66 |

FOREIGN PATENT DOCUMENTS

GB    1 530 445    11/1978

OTHER PUBLICATIONS

V. Ruddick et al., *J. Phys. Chem. B 101* (1997) 9240.
A. Dittmar et al., *Catal. Today 89* (2004) 169.
S. Jungling et al., *J. Organometal. Chem. 460* (1993) 191.
S. Noh et al., *J. Organometal. Chem. 518* (1996) 1.
S. Noh et al., *J.Organometal. Chem. 580* (1999) 90.
Halverson D.E. et al., *J: Vac. Sci. Technol. A 7* (1989), 40, "Ruthenium Impregnation of Plasma Grown Alumina Films".
Derwent Abstract No. 1986-044996.
Derwent Abstract No. 1987-318644.

* cited by examiner

*Primary Examiner*—J. A. Lorengo
*Assistant Examiner*—Veronica Faison-Gee
(74) *Attorney, Agent, or Firm*—John Tyrell; Jonathan L. Schuchardt

(57) ABSTRACT

A method for preparing an olefin polymerization catalyst is disclosed. An inorganic oxide is contacted with plasma and a transition metal compound is supported on the contacted inorganic oxide. The method is fast, convenient, and avoids many of the problems associated with known methods of supporting catalysts.

19 Claims, No Drawings

US 7,189,675 B2

OLEFIN POLYMERIZATION CATALYST ON PLASMA-CONTACTED SUPPORT

FIELD OF THE INVENTION

The invention relates to the preparation of an olefin polymerization catalyst and olefin polymerization processes that use the catalyst. The catalyst is supported on an inorganic oxide that has been contacted with plasma.

BACKGROUND OF THE INVENTION

Interest in catalysis continues to grow in the polyolefin industry. Many olefin polymerization catalysts are known, including conventional Ziegler-Natta catalysts. While these catalysts are inexpensive, they exhibit low activity and are generally poor at incorporating $\alpha$-olefin comonomers. To improve polymer properties, single-site catalysts, in particular metallocenes are beginning to replace Ziegler-Natta catalysts.

With both Ziegler-Natta catalysts and single-site catalysts, it is often an advantage to immobilize the catalyst on a support. This is particularly true for gas-phase, slurry, and bulk monomer processes. Inorganic oxides are known to be useful support materials, but there are often difficulties with catalyst deactivation due to moisture or hydroxyl groups in the inorganic oxide. Typically, the inorganic oxide is treated thermally, chemically, or both prior to use to minimize catalyst deactivation.

For example, U.S. Pat. No. 6,211,311 teaches that many heterometallocenes are inherently unstable and this causes poor catalyst activity and difficulties in supporting these catalysts. This problem is avoided by using chemically treated supports to prepare supported catalysts containing heteroatomic ligands. U.S. Pat. No. 6,559,251 discloses a process for polymerizing olefins with a silica-supported, indenoindolyl Group 4–6 transition metal complex having open architecture. The silica is preferably treated thermally, chemically, or both prior to use. The examples calcine the silica at 250° C. for 12 hours and then treat the silica with an aluminum compound.

While thermal treatment of the inorganic oxide reduces catalyst deactivation, long times and high temperatures are often required. The treatment can be expedited by passing a dry inert gas through the inorganic oxide, but this requires extra equipment and the inorganic oxide can be swept away with the gas. This can be a significant problem for small particle size supports. Chemical treatment is expensive and often requires handling reactive and flammable reagents. A new method for treating inorganic oxides to be used as supports for olefin polymerization catalysts is needed.

Plasma was studied by Langmuir in the early 1900s. More recently, plasma has become widely used in semiconductor fabrication for surface etching and also for plasma-assisted deposition of thin films. If energy is supplied to a gas, it becomes electrically conducting. The energized gas is plasma, which is a mixture of positively charged ions, electrons, and neutral particles. Plasmas have been generated by heating, by applying a voltage, or by irradiation with electromagnetic radiation such as microwaves. Plasma generation by electromagnetic radiation is sometimes referred to as "cold plasma."

There are several known plasma-treatment processes. For example, U.S. Pat. No. 5,364,519 generates plasma with microwaves for the fabrication of integrated circuits. U.S. Pat. No. 5,647,944 describes a microwave plasma treatment apparatus having a high ashing treatment speed by means of controlling microwaves inside a wave guide tube. U.S. Pat. No. 6,582,778 discloses a method of treating microwave plasma by maintaining a reduced pressure in the plasma-treatment chamber. The patentees use this technique to deposit a film on the surface of a container. U.S. Pat. No. 5,278,384 describes an apparatus that is suitable for a large scale and high capacity. The apparatus generates plasma with an arc torch generator and is used to coat the surface of powder particles.

The use of plasma to oxidize chromium ligands to $CrO_x$ was studied for chromium(III) acetate on silica and chromium(III) acetylacetonate on silica to prepare Phillips-type ethylene polymerization catalysts (see *J. Phys. Chem. B* 101 (1997) 9240). These catalysts, prepared by plasma oxidation, had similar ethylene polymerization activity to those prepared by thermal oxidation of the chromium ligands at 1053° K. In a control experiment, plasma treatment of silica alone showed a loss of water and none of the CO and $CO_2$ generated in the preparation of the chromium catalysts. The authors did not use plasma to treat the silica prior to supporting the transition metal compound. Rather, they used plasma to oxidize the transition metal compound.

Before studying the plasma chemical preparation of chromia supported on zirconia or lanthanum-doped zirconia, the effect of microwave-generated plasma on zirconias without chromium treatment was spectroscopically determined (*Catal. Today* 89 (2004) 169). A decrease in the number of hydroxyl groups was observed.

New methods for preparing supported olefin polymerization catalysts are needed. Despite the many applications of plasma, apparently no one has used plasma to prepare an olefin polymerization catalyst by contacting an inorganic oxide with plasma prior to supporting a transition metal compound. Plasma contact is as effective as thermal or chemical treatment, but with much shorter times, fewer handling issues, and without the need for hazardous reagents.

SUMMARY OF THE INVENTION

The invention is a method for preparing an olefin polymerization catalyst. An inorganic oxide is contacted with plasma, and a Group 3–10 transition or lanthanide metal compound is supported on the plasma-contacted inorganic oxide. The method is fast, convenient, and avoids many of the problems associated with known methods of supporting catalysts.

DETAILED DESCRIPTION OF THE INVENTION

To prepare a catalyst according to the method of the invention, an inorganic oxide is first contacted with plasma. Suitable inorganic oxides include silica, alumina, magnesia, titania, zirconia, aluminosilicates, clays, zeolites, and mixtures thereof. Silica is preferred.

When silica is used, it preferably has a surface area in the range of about 10 to about 1000 $m^2/g$, more preferably from about 50 to about 800 $m^2/g$ and most preferably from about 200 to about 700 $m^2/g$. Preferably, the pore volume of the silica is in the range of about 0.05 to about 4.0 mL/g, more preferably from about 0.08 to about 3.5 mL/g, and most preferably from about 0.1 to about 3.0 mL/g. Preferably, the average particle size of the silica is in the range of about 1 to about 500 microns, more preferably from about 2 to about 200 microns, and most preferably from about 2 to about 30 microns. The average pore diameter is typically in the range of about 5 to about 1000 angstroms, preferably about 10 to about 500 angstroms, and most preferably about 20 to about 350 angstroms.

The inorganic oxide is contacted with plasma. The plasma is generated by irradiating a carrier gas with electromagnetic radiation. Preferably, the plasma is generated with electromagnetic radiation having a frequency from about 0.01 to about $10^6$ MHz, more preferably from about 300 to about $10^5$ MHz, and most preferably from about $10^3$ to about $10^4$ MHz. Microwave generators commonly operate at a frequency of $2.45 \times 10^3$ MHz, and that is a convenient frequency to use. A combination of frequencies may also be used. When a combination of frequencies is used, this is sometimes called a mixed-frequency or dual-frequency plasma.

Several types of carrier gases may be used. Some carrier gases, such as acetylene or silicon tetrafluoride, can create a deposit on the surface of the inorganic oxide. This can be useful to prepare a support material for certain transition metal compounds. Preferably, the carrier gas does not create a deposit. More preferably, the carrier gas is selected from the group consisting of oxygen, helium, neon, argon, xenon, nitrogen, air, and mixtures thereof. Most preferably, the carrier gas is oxygen.

One useful method is to place the inorganic oxide in a plasma-treatment chamber and apply vacuum to the chamber. Preferably, the pressure is reduced to below 100 Pa, more preferably below 10 Pa. A carrier gas is introduced to supply a partial pressure of from 20 to 200 Pa, and radiation is supplied to generate the plasma. A microwave chamber can be conveniently used. The time needed will depend upon the wattage of the radiation and certain characteristics of the inorganic oxide such as particle size and moisture content. Preferably, the plasma contact will be done at a temperature below 200° C. Generally, plasma treatment will be done for about 1 to about 200 minutes, preferably from about 2 to about 50 minutes.

Preferably, the plasma contact is done continuously. A continuous feed of inorganic oxide through a plasma-treatment chamber enables high throughput and the ability to treat large quantities of inorganic oxide.

After plasma contact, a Group 3 to 10 transition or lanthanide metal compound is supported on the inorganic oxide to prepare an olefin polymerization catalyst.

The olefin polymerization catalyst can be any catalyst system that polymerizes olefins, including Ziegler-Natta or single-site catalysts. When the catalyst is a Ziegler-Natta catalyst, the transition metal is preferably Ti or V; more preferably, the transition metal is Ti. Suitable transition metal compounds include $TiCl_4$, $TiCl(OCH_2CH_3)_3$, $VOCl_3$, $VCl_4$, and the like. When the catalyst is a Ziegler-Natta catalyst, a cocatalyst is also used. Preferably, the cocatalyst is selected from the group consisting of trialkylaluminums, dialkylaluminum halides, and alkylaluminum dihalides. Suitable cocatalysts include triethylaluminum, triisobutylaluminum, diethylaluminum chloride, butylaluminum dichloride, and the like, and mixtures thereof.

Preferably, the olefin polymerization catalyst is a single-site catalyst which comprises an activator and an organometallic complex. The organometallic complex is preferably a Group 3 to 10 transition or lanthanide metal compound with at least one polymerization-stable anionic ligand bonded to the metal. More preferred complexes include a Group 4 transition metal such as titanium or zirconium.

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl).

Preferably, the polymerization-stable anionic ligand is selected from the group consisting of substituted or unsubstituted cyclopentadienyl, indenyl, fluorenyl, boraaryl, pyrrolyl, indolyl, indenoindolyl, quinolinoxy, pyridinoxy, and azaborolinyl. More preferably, the polymerization-stable anionic ligand is indenoindolyl.

Optionally, two polymerization-stable anionic ligands are connected by a divalent linking group to form bridged ligands. A wide variety of linking groups are suitable for use and are described in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-ethylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. (For some examples, see *J. Organometal. Chem.* 460 (1993) 191; 518 (1996) 1; 580 (1999) 90.)

Bridged ligands also include those used in open architecture complexes. By "open architecture," we mean a complex having a fixed geometry that enables generation of a highly exposed active site when the catalyst is combined with an activator. When the organometallic complex has open architecture, it preferably has the general structure:

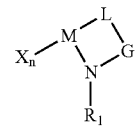

in which M is a Group 4–6 transition metal, L is a polymerization-stable anionic ligand, G is a linking group, $R_1$ is $C_1$–$C_{20}$ hydrocarbyl, X is alkyl, aryl, alkoxy, aryloxy, halide, dialkylamino, or siloxy, and n satisfies the valence of M. More preferably, M is a Group 4 transition metal, G is dialkylsilyl, and X is halide or alkyl $R_1$ is preferably $C_3$–$C_{10}$ hydrocarbyl, more preferably $C_4$ hydrocarbyl.

Exemplary open architecture organometallic complexes useful for the process of the invention:

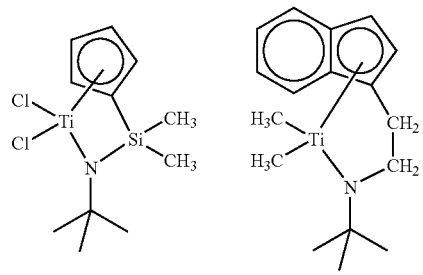

-continued

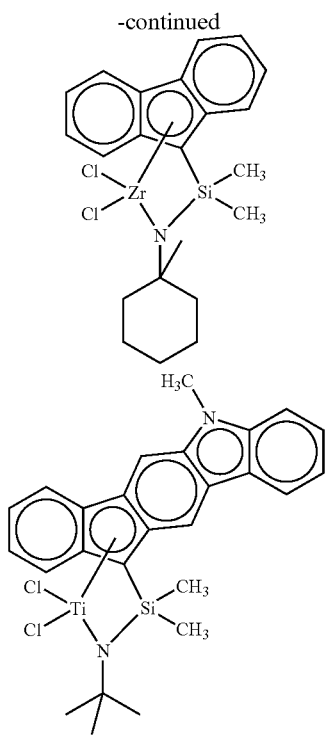

Preferably, when two polymerization-stable anionic ligands are connected by a divalent linking group to form bridged ligands, at least one of the polymerization-stable anionic ligands is an indenoindolyl ligand. Preferably, the bridged indenoindolyl complex has the general structure:

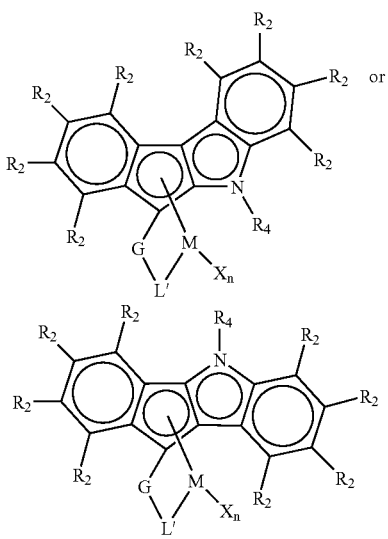

wherein M is a Group 4 to 6 transition metal; X is alkyl, aryl, alkoxy, aryloxy, halide, dialkylamino, or siloxy, and n satisfies the valence of M; L' is selected from the group consisting of alkylamido, substituted or unsubstituted cyclopentadienyl, fluorenyl, indenyl, boraaryl, pyrrolyl, azaborolinyl and indenoindolyl; $R_4$ is selected from the group consisting of $C_1$–$C_{30}$ hydrocarbyl, dialkylboryl and trialkylsilyl; each $R_2$ is independently selected from the group consisting of $C_1$–$C_{30}$ hydrocarbyl, H, F, Cl and Br; G is a divalent radical is selected from the group consisting of hydrocarbyl and heteroatom-containing alkylene radicals, diorganosilyl radicals, diorganogermanium radicals and diorganotin radicals.

The complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked with a second polymerization-stable ligand to give a linked ligand precursor. The final step normally involves reaction of the ligand precursor with a transition metal source to give the organometallic complex. The exact synthetic steps and the sequence used will normally depend upon the other ligands used and the transition metal source.

Olefin polymerizations using supported catalysts made by the method of the invention are preferably performed in the presence of an activator. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutylaluminum), and the like. Suitable activators include salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 10 moles, of activator per mole of M.

The amount of transition metal compound added per g contacted inorganic oxide is preferably from 0.01 mmol per gram to 0.5 mmol per gram.

The activator can be added directly to the polymerization reactor before or after adding an inorganic oxide-supported transition metal compound. In other words, a supported complex—without the activator—can be prepared first. In one preferred process, a solution of the transition metal compound is combined with the plasma-treated inorganic oxide. The mixture is stirred in an inert atmosphere at a temperature of from about 0° C. to about 120° C., more preferably from about 20° C. to about 40° C. The optimum stirring time will vary somewhat, depending upon the amounts of aromatic solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free flowing solid. This can be done at room temperature by applying a vacuum. In one preferred embodiment, an incipient wetness technique is used. A small amount of solvent is used to dissolve the complex and the solution is added to the plasma-treated inorganic oxide. The mixture remains a free flowing solid without solvent removal. The mixture can be used as is or residual solvent may be removed.

In another preferred method, a solution of the activator is added to the contacted inorganic oxide prior to the addition of the transition metal compound. This solution can contain all of the activator to be used, but it preferably contains a portion of the activator to be used. Any remaining activator is added to the reactor at the start of the polymerization.

Even more preferably, the transition metal compound is premixed with a solution of some or all of the activator prior to addition to the plasma-treated inorganic oxide. Preferably, the transition metal compound and activator solution are premixed for a period of time between 1 minute and two hours. When the transition metal compound is premixed with a solution of the activator, it is preferable to use a portion of the activator and to add the remainder of the activator to the reactor prior to the addition of the premix. In this case, an alkyl aluminum compound is preferably added to the reactor prior to the addition of the catalyst supported on the contacted inorganic oxide.

Preferably, a scavenging amount of an alkyl aluminum compound such as triethyl aluminum or triisobutyl aluminum is also added to the reactor. Preferably, the alkyl aluminum compound is added to the reactor prior to the addition of the supported complex.

When the transition metal compound is a Ziegler-Natta catalyst, an activator is preferably not used. Preferably, the Ziegler-Natta catalyst is supported on the contacted inorganic oxide and added to the reactor separately from the cocatalyst.

Preferably, the olefin is an alpha-olefin. More preferably, the olefin is selected from the group consisting of ethylene, propylene, 1-butene, 1-hexene, 1-octene, and mixtures thereof. Most preferably, the olefin is ethylene or a mixture of ethylene with a second olefin.

Optionally, hydrogen is used in the polymerization to regulate polymer molecular weight. The amount of hydrogen needed depends upon the desired polyolefin molecular weight and melt flow properties. Generally, as the amount of hydrogen is increased, the polyolefin molecular weight decreases and the melt flow rate increases. For many applications, the polyolefin melt flow rate will be too low if the polymerization is done in the absence of hydrogen.

A wide variety of olefin polymerization processes can be used. A slurry or gas-phase process is preferably used.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 0.1 MPa to about 350 MPa. More preferred is the range from about 0.5 MPa to about 25 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Synthesis of [1,1-Dimethyl-1-(cyclopentadienyl)silyl]-5,6-dihydrido-5-methyl-indeno[2,1-b]indolylzirconium dichloride, 5

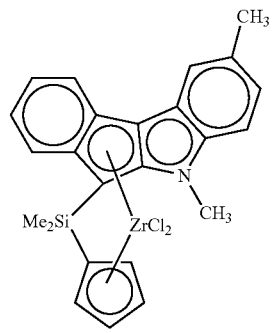

(a) Preparation of Indeno[2,1-b]indole 1. A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 hours. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over sodium sulfate, filtered, and is then concentrated to 450 mL and cooled to −30° C. for 3 days. The crystalline solid is filtered and washed with chilled (−78° C.) hexanes (2×500 mL). The beige solid is collected and dried under vacuum (47.1 g, 56%).

(b) N-Methylation of 1 to give 2. A slurry of aqueous NaOH (42 mL, 21.5 M, 903 mmol), $C_{16}H_{33}NMe_3Br$ (0.36 g, 0.97 mmol), and 1 (15.0 g, 68.4 mmol) is combined with toluene (50 mL). A solution of methyl iodide (8.0 mL, 129 mmol) in toluene (15 mL) is added dropwise at room temperature. The mixture is stirred at room temperature for 2.5 hours and then refluxed for an hour. The mixture turns red and is cooled to room temperature and filtered. The crystalline solid is washed with chilled (−30° C.) ethanol (200 mL) followed by chilled hexanes (200 mL) to afford a pale red solid (10.3 g, 65%).

(c) Anion generation: Preparation of 3. n-Butyllithium (13.0 mL, 2.5 M in hexanes, 32.5 mmol) is added at room temperature to a slurry of 2 (4.94 g, 21.1 mmol) in toluene (125 mL). The mixture is maintained at room temperature and turns pale yellow. A precipitate forms after 2 hours. After 2 days, the mixture is filtered to give a pale beige solid. The solid is washed with toluene (60 mL), followed by hexanes (30 mL), and is then collected and dried under vacuum (4.37 g, 87%).

(d) Preparation of Dianion 4. Product 3 (4.57 g, 19.1 mmol) is suspended in toluene (100 mL). Diethylether (40 mL) is added dropwise to afford an orange solution, which is added to a solution of $SiCl_2Me_2$ (12.0 mL, 98.9 mmol) in diethylether (100 mL) at room temperature. The mixture turns cloudy and dirty beige and is stirred for 3 days and filtered to give a dark red-orange solution. Volatiles are removed under reduced pressure to afford an oily solid. An aliquot is analyzed by $^1$H NMR, revealing formation of the desired product; 100% conversion is presumed. The oily solid is dissolved in diethylether (140 mL), and sodium cyclopentadienide (11.0 mL, 2.0 M in tetrahydrofuran, 22 mmol) is added. A precipitate forms immediately, and stirring continues for 2 days. The mixture is washed with water (3×50 mL), and the organic phase is dried over sodium sulfate and filtered. Volatiles are removed under vacuum to give an oily residue, and 100% conversion is assumed. The residue was dissolved in diethylether (75 mL) and cooled to −78° C. n-Butyllithium (18.0 mL, 2.5 M in hexanes, 45.0 mmol) is added by syringe, and the mixture is warmed to room temperature slowly. A yellow solid precipitates overnight, and volatiles are removed under vacuum. The crude material is washed with hexanes (100 mL) and filtered to afford a yellow powder. The powder is collected and dried under vacuum (6.73 g, 93%).

(e) Preparation of Complex 5: Zirconium tetrachloride (3.15 g, 13.5 mmol) is combined with toluene (100 mL) and dissolved in diethylether (50 mL) to produce a cloudy suspension. Dianion 4 (5.02 g, 13.7 mmol) is added as a solid in portions over the course of 30 min. The color turns from yellow to dark orange, and a precipitate forms. The mixture is maintained at room temperature for 2 days and is filtered to give a dirty yellow solid. The solid is washed with toluene (50 mL) and hexanes (50 mL). The yellow powder is collected and dried under vacuum (3.72 g, 53%).

EXAMPLE 2

Plasma Contact

Crosfield ES757 silica (2.0 g) is placed in a plasma-treatment chamber and vacuum is applied to the chamber to bring the pressure to 5 Pa. Oxygen gas is introduced into the chamber to bring the total pressure to 55 Pa. Microwave radiation is supplied to the chamber (frequency of 2450 MHz and power of 0.3 kW) to generate oxygen plasma. After 15 minutes, the radiation is stopped, and the contacted silica is removed from the chamber and stored in a glove-box under nitrogen.

EXAMPLE 3

Preparation of Silica-Supported Catalyst

In a glove-box under nitrogen, 3.1 mL of 30 wt. % of methylalumoxane (MAO) in toluene is mixed with 45 mg (0.084 mmol) of complex 5 from Example 1 to make a deep red solution. This solution is then slowly added at room temperature to the contacted silica from Example 2 (2.0 g). After the addition is complete, stirring continues at room temperature for 0.5 h. Volatiles are removed by vacuum to give a supported olefin polymerization catalyst.

EXAMPLE 4

Copolymerization of Ethylene and 1-Hexene

A one-liter, stainless-steel reactor is charged with 1-hexene (75 mL). Triisobutylaluminum (1.0 mL of 1.0 M solution in heptane, 1.0 mmol) and Stadis fatty amine (12 mg, product of Akzo Nobel) in heptane solution (3.0 mL) are mixed in one sidearm of the injector. This mixture is then flushed into the reactor with nitrogen pressure and isobutane (about 350 mL). Hydrogen is added (120 dpsig from a 10-mL stainless-steel cylinder pressurized initially to 500 psig $H_2$) to the reactor, which is then pressurized with ethylene to 356 psig. The reactor contents are allowed to equilibrate at 75° C. The supported catalyst from Example 3 (25–27 mg) is loaded into the other injector arm and then flushed into the reactor with isobutane (75 mL) and nitrogen pressure. The polymerization proceeds for 0.5 h. An ethylene-hexene copolymer is the expected product.

COMPARATIVE EXAMPLE 5

Thermal Treatment

Crosfield ES757 silica (2.0 g) is heated at 500° C. with a steady stream of heated, dry nitrogen. After 12 hours, the silica is transferred to a glove-box under nitrogen, and 3.1 mL of 30 wt. % of methylalumoxane (MAO) in toluene is mixed with 45 mg (0.084 mmol) complex 5 from Example 1 to make a deep red solution. This solution is then slowly added at room temperature to the thermally treated silica. After the addition is complete, stirring continues at room temperature for 0.5 h. Volatiles are removed by vacuum to give a supported olefin polymerization catalyst. The supported catalyst is used in a polymerization performed as in Example 4.

COMPARATIVE EXAMPLE 6

Chemical Treatment

Neat hexamethyldisilazane (0.25 g) is slowly added to stirring Crosfield ES757 silica (2.0 g). The HMDS-treated silica is dried for 6 h at 600° C. with dry nitrogen gas flow. The silica is transferred to a glove-box under nitrogen, and 3.1 mL of 30 wt. % of methylalumoxane (MAO) in toluene is mixed with 45.1 mg (0.084 mmol) complex 5 from Example 1 to make a deep red solution. This solution is then slowly added at room temperature to the thermally treated silica. After the addition is complete, stirring continues at room temperature for 0.5 h. Volatiles are removed by vacuum to give a supported olefin polymerization catalyst. The supported catalyst is used in a polymerization performed as in Example 4.

The polymerization (Example 4) performed with catalyst supported on plasma-contacted silica is expected to exhibit similar catalyst activity compared with the polymerizations done with a catalyst supported on thermally treated silica (Comparative Example 5) or chemically treated silica (Comparative Example 6). The plasma contact is faster, more convenient, and avoids hazardous reagents.

The preceding examples are meant only as illustrations. The following claims define the invention.

I claim:

1. A method which comprises preparing an olefin polymerization catalyst by contacting an inorganic oxide with plasma and supporting a Group 3 to 10 transition or lanthanide metal compound on the plasma-contacted inorganic oxide wherein the transition metal compound contains a polymerization-stable anionic ligand.

2. The method of claim 1 wherein the plasma is generated with electromagnetic radiation having a frequency from about 0.01 to about $10^6$ MHz or combinations thereof.

3. The method of claim 2 wherein the frequency is from about 300 to about $10^5$ MHz.

4. The method of claim 3 wherein the frequency is from about $10^3$ to about $10^4$ MHz.

5. The method of claim 2 wherein a combination of electromagnetic radiation frequencies is used.

6. The method of claim 2 wherein the plasma is generated by irradiating a carrier gas selected from the group consisting of oxygen, helium, neon, argon, xenon, nitrogen, air, and mixtures thereof.

7. The method of claim 6 wherein the carrier gas is oxygen.

8. The method of claim 1 wherein the inorganic oxide is contacted with plasma at a temperature below 200°.

9. The method of claim 1 wherein the inorganic oxide is contacted with plasma for a time from about 1 minute to about 200 minutes.

10. The method of claim 9 wherein the time is from about 2 minutes to about 50 minutes.

11. The method of claim 1 wherein the inorganic oxide is selected from the group consisting of silica, alumina, and aluminosilicates.

12. The method of claim 11 wherein the inorganic oxide is silica.

13. The method of claim 12 wherein the silica has an average particle size of from about 1 to about 500 microns.

14. The method of claim 13 wherein the silica has an average particle size of from about 2 to about 30 microns.

15. The method of claim 1 wherein the polymerization-stable anionic ligand is selected from the group consisting of substituted or unsubstituted cyclopentadienyl, indenyl, fluorenyl, boraaryl, pyrrolyl, indolyl, indenoindolyl, quinolinoxy, pyridinoxy, and azaborolinyl.

16. The method of claim 15 wherein the polymerization-stable anionic ligand is an indenoindolyl ligand.

17. A process which comprises polymerizing an olefin in the presence of a catalyst made by the method of claim 1.

18. The process of claim 17 wherein the olefin is polymerized in the presence of the catalyst and an activator selected from the group consisting of alumoxanes, organoboranes, and ionic borates.

19. The process of claim 18 wherein the olefin is selected from the group consisting of ethylene, propylene, 1-butene, 1-hexene, 1-octene, and mixtures thereof.

* * * * *